(12) United States Patent
Bewersdorf et al.

(10) Patent No.: US 9,769,399 B2
(45) Date of Patent: Sep. 19, 2017

(54) TECHNIQUES FOR PROCESSING IMAGING DATA HAVING SENSOR-DEPENDENT NOISE

(71) Applicant: Yale University, New Haven, CT (US)

(72) Inventors: Joerg Bewersdorf, Branford, CT (US); Fang Huang, New Haven, CT (US)

(73) Assignee: Yale University, New Haven, CT (US)

( * ) Notice: Subject to any disclaimer, the term of this patent is extended or adjusted under 35 U.S.C. 154(b) by 32 days.

(21) Appl. No.: 14/776,523

(22) PCT Filed: Mar. 14, 2014

(86) PCT No.: PCT/US2014/028856
§ 371 (c)(1),
(2) Date: Sep. 14, 2015

(87) PCT Pub. No.: WO2014/144443
PCT Pub. Date: Sep. 18, 2014

(65) Prior Publication Data
US 2016/0044255 A1    Feb. 11, 2016

Related U.S. Application Data

(60) Provisional application No. 61/786,796, filed on Mar. 15, 2013.

(51) Int. Cl.
*G06K 9/40*    (2006.01)
*H04N 5/357*    (2011.01)
(Continued)

(52) U.S. Cl.
CPC ............... *H04N 5/357* (2013.01); *G06T 5/20* (2013.01); *H04N 5/2173* (2013.01);
(Continued)

(58) Field of Classification Search
CPC ...... H04N 5/2173; H04N 5/357; H04N 5/378; G06T 2207/20026; G06T 5/20
(Continued)

(56) References Cited

U.S. PATENT DOCUMENTS 7,280,141 B1    10/2007    Frank et al.
8,269,862 B2    9/2012    Sasaki
(Continued)

FOREIGN PATENT DOCUMENTS

CN    102739948 A    10/2012

OTHER PUBLICATIONS

Invitation to Pay Additional Fees mailed Aug. 7, 2014 for Application No. PCT/US2014/028856.
(Continued)

*Primary Examiner* — Kanjibhai Patel
(74) *Attorney, Agent, or Firm* — Wolf, Greenfield & Sacks, P.C.

(57) ABSTRACT

Techniques for processing imaging data contaminated by sensor-dependent noise. An imaging method is described. In the imaging method, imaging data corresponding to an imaged region and acquired by at least first and second sensor elements is obtained. A parameterized model is fitted to the imaging data. The parameterized model includes a first sensor-dependent model of noise generated by the first sensor element in a first portion of the imaging data acquired by the first sensor element, and a second sensor-dependent model of noise generated by a second sensor element in a second portion of the imaging data acquired by the second sensor element. The first sensor-dependent noise model differs, at least in part, from the second sensor-dependent noise model.

46 Claims, 3 Drawing Sheets

(51) Int. Cl.
*H04N 5/217* (2011.01)
*G06T 5/20* (2006.01)
*H04N 5/374* (2011.01)
*H04N 5/378* (2011.01)

(52) U.S. Cl.
CPC ............ *H04N 5/374* (2013.01); *H04N 5/378* (2013.01); *G06T 2207/20076* (2013.01)

(58) Field of Classification Search
USPC ........................................................ 382/275
See application file for complete search history.

(56) References Cited

U.S. PATENT DOCUMENTS

| | | | |
|---|---|---|---|
| 8,275,213 | B2 | 9/2012 | Richardson |
| 8,335,391 | B2 | 12/2012 | Watarai |
| 8,391,629 | B2 | 3/2013 | Ovsiannikov |
| 8,451,284 | B2 | 5/2013 | Bilbrey et al. |
| 8,456,557 | B2 | 6/2013 | Wang et al. |
| 8,462,220 | B2 | 6/2013 | Barna et al. |
| 8,478,062 | B2 | 7/2013 | Kumar et al. |
| 8,768,046 | B2 * | 7/2014 | Ernst ................ G06T 7/0018 382/154 |
| 9,313,420 | B2 | 4/2016 | Seshadrinathan et al. |
| 2003/0206231 | A1 | 11/2003 | Chen et al. |
| 2007/0273795 | A1 | 11/2007 | Jaynes et al. |
| 2007/0297019 | A1 | 12/2007 | Foi et al. |
| 2008/0152248 | A1 | 6/2008 | Kelly |
| 2011/0103710 | A1 | 5/2011 | Choi et al. |
| 2011/0301436 | A1* | 12/2011 | Teixeira ............... A61B 5/0402 600/301 |
| 2012/0075505 | A1 | 3/2012 | Van Beek |
| 2012/0075506 | A1 | 3/2012 | Van Beek |
| 2012/0127350 | A1 | 5/2012 | Alfonso |
| 2012/0135535 | A1 | 5/2012 | Grier et al. |
| 2013/0089247 | A1 | 4/2013 | Mercuriev |
| 2013/0129212 | A1 | 5/2013 | Fomitchov et al. |
| 2013/0135496 | A1 | 5/2013 | Nomura |
| 2013/0271628 | A1 | 10/2013 | Ku et al. |
| 2013/0342674 | A1 | 12/2013 | Dixon |

OTHER PUBLICATIONS

International Preliminary Report on Patentability mailed Sep. 24, 2015 for Application No. PCT/US2014/028856.

Ober et al., Localization Accuracy in Single-Molecule Microscopy. Biophys J. Feb. 2004;86(2): 1185-200.

Extended European Search Report mailed Jul. 29, 2016 for Application No. EP 14763896.9.

Foi et al., Practical Poissonian-Gaussian Noise Modeling and Fitting for Single-Image Raw-Data. IEEE Trans Image Proc. Oct. 2008;17(10):1737-54.

International Search Report and Written Opinion dated Sep. 24, 2014 from corresponding International Application No. PCT/US2014/028856.

Ober et al., Localization Accuracy in Single-Molecule Microscopy, *Biophysical Journal*, (Feb. 2014) vol. 86, pp. 1185-1200.

Hernandez-Palacios et al., Low-Light hyperspectral imager for characterization of biological samples based on an sCMOS image sensor, Proc. of SPIE, vol. 7891, 78910V-1.

Köklü et al., Empowering Lo-Cost CMOS Cameras by Image Processing to Reach Comparable Results with Costly CCDs, *BioNanoSci.*, (2013), vol. 3, pp. 403-414.

Beier et al., Experimental Comparison of High-Speed Imaging Performance of an EM-CCD and sCMOS Camera in a Dynamic Live-Cell Imaging Test Case, PLOS ONE, (Jan. 2014) vol. 9, Issue 1, pp. 1-6.

Fullerton et al., Optimization of Precision Localization Microscopy using CMOS Camera Technology, Proc. of SPIE , vol. 8228, 82280T-1.

Huang et al., Video-rate nanoscopy using sCMOS camera-specific single-molecule localization algorithms, *Nature Methods*, (Jul. 2013), vol. 10, No. 7, pp. 653-658.

* cited by examiner

TECHNIQUES FOR PROCESSING IMAGING DATA HAVING SENSOR-DEPENDENT NOISE

RELATED APPLICATIONS

This application is the national phase of International Application No. PCT/US2014/028856, filed Mar. 14, 2014 and claims priority under 35 U.S.C. §119(e) to U.S. application No. 61/786,796, filed Mar. 15, 2013 titled, TECHNIQUES FOR PROCESSING IMAGING DATA HAVING SENSOR-DEPENDENT NOISE, which applications are hereby incorporated by reference to the maximum extent allowable by law.

BACKGROUND

Technical Field

The techniques described herein relate generally to image processing. Some embodiments relate to processing imaging data contaminated by sensor-dependent noise.

Discussion of the Related Art

Complementary metal-oxide semiconductor (CMOS) cameras convert optical signals (e.g., visible light) into electrical signals, which can be processed to form images or to determine attributes of an imaged region. CMOS cameras typically include an array of pixel sensors ("pixels"), each of which includes a photosensitive region for converting optical signals to electrical signals, and a readout structure for amplifying the converted electrical signals and/or supplying the converted electrical signals to data processing components.

CMOS cameras can introduce some noise into the electrical signals corresponding to an imaged region. One type of noise introduced by CMOS cameras is "readout noise." Readout noise, which refers to noise introduced by a camera's readout circuitry (e.g., the amplification circuitry, the analog-to-digital conversion circuitry, and the circuitry that couples a pixel's signal to data processing components), may also be modeled as a random variable with a Gaussian probability distribution. Readout noise is said to be "pixel-dependent" because the characteristics of a CMOS camera's readout noise may vary from pixel to pixel.

Another type of noise introduced by CMOS cameras is "photon shot noise" or "shot noise." Shot noise, which arises from the photon detection process and may be significant when the number of photons incident on a pixel's photosensitive region is small (e.g., under low-light conditions), may be modeled as a random variable with a Poisson distribution. Shot noise depends on the number of incident photons and is therefore correlated with the input signal.

Some quantitative imaging techniques, such as single-molecule localization techniques (e.g., localization-based nanoscopy and/or single-particle tracking), rely on accurate and precise localization of single molecules. As just one example, single-molecule switching nanoscopy (SMSN) techniques are used to localize single molecules (e.g., with precisions on the order of approximately 10 nm) by stochastically switching single molecules on and off. A plurality of camera frames (e.g., hundreds, thousands, or even tens of thousands of camera frames) of blinking subsets of molecules may be recorded to obtain a single image with a resolution of approximately 25 nm to 40 nm. The temporal and spatial resolutions of such images are limited by several factors, including the number of photons emitted by a single molecule per frame, the sensitivity (e.g., quantum efficiency) of the camera, and the readout speed of the camera.

SUMMARY

According to an aspect of the present disclosure, a processor-implemented imaging method is provided, comprising obtaining imaging data corresponding to an imaged region and acquired by at least first and second sensor elements, and, using a processor, fitting a parameterized model to the imaging data. The parameterized model includes a first sensor-dependent model of noise generated by the first sensor element in a first portion of the imaging data acquired by the first sensor element, and a second sensor-dependent model of noise generated by a second sensor element in a second portion of the imaging data acquired by the second sensor element. The first sensor-dependent noise model differs, at least in part, from the second sensor-dependent noise model.

In some embodiments, fitting the parameterized model to the imaging data comprises using statistical estimation to fit the parameterized model to the imaging data.

In some embodiments, the imaging method further comprises determining one or more values of one or more respective parameters of each of the first and second sensor-dependent noise models, and using at least one parameter value of each of the first and second sensor-dependent noise models to identify at least one subset of the imaging data for further processing, wherein using statistical estimation to fit the parameterized model to the imaging data comprises estimating one or more values of one or more respective parameters of the parameterized model, and characterizing a quality of a fit between the at least one subset of the imaging data and the parameterized model having the one or more parameters with the one or more respective estimated values.

In some embodiments, using statistical estimation to fit the parameterized model to the imaging data comprises using maximum likelihood estimation (MLE) to fit the parameterized model to the imaging data, and characterizing a quality of a fit between the at least one subset of the imaging data and the parameterized model comprises using the first and second noise models to determine a log-likelihood ratio and/or to determine a Cramer-Rao lower bound (CRLB).

In some embodiments, using MLE to fit the parameterized model to the imaging data comprises estimating one or more values of one or more respective parameters $\theta$ according to the expression $$\hat{\theta} = \operatorname*{argmin}_{\theta} \left\{ -\ln\left[ \prod_{i=1}^{M} P(x = [(D_i - o_i)/g_i + \operatorname{var}_i/g_i^2] \mid u_i(\theta), bg, \operatorname{var}_i, g_i, o_i) \right] \right\},$$

wherein $D_i$ is an observed analog-to-digital unit (ADU) count of pixel i, $u_i$ is a number of expected photoelectrons of pixel i, $g_i$ is an amplification gain of pixel i, $o_i$ is an offset of readout noise of pixel i, $\operatorname{var}_i$ is a variance of the readout noise of pixel i, and bg is the expected background ADU count of pixel i.

In some embodiments, using statistical estimation to fit the parameterized model to the imaging data comprises combining the first sensor-dependent noise model with a parameter-dependent photon shot noise model to obtain an estimate of sensor-dependent noise and photon shot noise in a first portion of the imaging data corresponding to the first sensor, and combining the second sensor-dependent noise model with a parameter-dependent photon shot noise model to obtain an estimate of sensor-dependent noise and photon shot noise in a second portion of the imaging data corresponding to the second sensor, wherein the parameter-dependent photon shot noise model depends, at least in part, on the one or more estimated parameter values of the parameterized model.

In some embodiments, combining the first sensor-dependent noise model with the parameter-dependent photon shot noise model comprises determining a convolution of the first sensor-dependent noise model with the parameter-dependent photon shot noise model.

In some embodiments, combining the first sensor-dependent noise model with the parameter-dependent photon shot noise model comprises analytically approximating a convolution of the first sensor-dependent noise model with the parameter-dependent photon shot noise model.

In some embodiments, analytically approximating the convolution of the first sensor-dependent noise model with the parameter-dependent photon shot noise model comprises analytically approximating a probability distribution $P_i(x)$ of an ADU count of a pixel i using an expression including a term $e^{-\lambda}\lambda^x$.

In some embodiments, the probability distribution of the ADU count of pixel i is given by $$P_i(x = [(D_i - o_i)/g_i + var_i/g_i^2] \mid u_i, var_i, g_i, o_i) = \frac{e^{-(\mu_i + var_i/g_i^2)}(\mu_i + var_i/g_i^2)^x}{\Gamma(x+1)},$$

wherein $D_i$ is an observed ADU count of pixel i, $u_i$ is a number of expected photoelectrons of pixel i, $g_i$ is an amplification gain of pixel i, $o_i$ is an offset of readout noise of pixel i, $var_i$ is a variance of the readout noise of pixel i, and $\Gamma(x) = \int_0^\infty e^{-t} t^{x-1} dt$.

In some embodiments, using at least one parameter value of the first and second sensor-dependent noise models to identify at least one subset of the imaging data for further processing comprises using one or more parameter values of the first sensor-dependent noise model to filter noise in the first portion of the imaging data acquired by the first sensor, and using one or more parameter values of the second sensor-dependent noise model to filter noise in the second portion of the imaging data acquired by the second sensor.

In some embodiments, using one or more parameter values of the first sensor-dependent noise model to filter noise in the first portion of the imaging data comprises filtering the first portion of the imaging data using a filter kernel defined by $$unif(D_i, n) = \frac{\sum_{i \in C_{n \times n}} \left[\frac{(D_i - o_i)}{g_i var_i}\right]}{\sum_{i \in C_{n \times n}} var_i^{-1}},$$

wherein $D_i$ is an observed ADU count of pixel i, $g_i$ is an amplification gain of pixel i, $o_i$ is an offset of readout noise of pixel i, $var_i$ is a variance of the readout noise of pixel i, n is a kernel size, and $C_{n \times n}$ is a kernel region including pixel i.

In some embodiments, estimating one or more values of one or more respective parameters of the parameterized model comprises estimating one or more locations of one or more respective molecules and/or particles.

In some embodiments, the imaging method further comprises using the imaging data and the one or more estimated values of the one or more respective parameters to perform molecular localization, particle tracking, and/or super-resolution microscopy.

In some embodiments, the imaging method further comprises using at least the first and second sensor elements to acquire the imaging data, wherein using at least the first and second sensor elements to acquire the imaging data comprises using at least first and second pixels to acquire the imaging data, and each of the first and second pixels includes a photosensitive region of a semiconductor and a portion of the semiconductor configured to read out data from the pixel.

In some embodiments, using at least first and second pixels to acquire the imaging data comprises using at least first and second CMOS pixels to acquire the imaging data.

In some embodiments, using at least first and second pixels to acquire the imaging data comprises using at least first and second sCMOS pixels to acquire the imaging data.

In some embodiments, the imaging method further comprises determining one or more values of one or more respective parameters of each of the first and second sensor-dependent noise models, wherein the one or more parameter values of the first sensor-dependent noise model differ, at least in part, from the one or more parameter values of the second sensor-dependent noise model.

In some embodiments, each of the first and second sensor-dependent noise models comprises a Gaussian probability distribution function, and determining the one or more parameter values of each of the first and second sensor-dependent noise models comprises determining, as one or more parameter values of the Gaussian probability distribution function of the first sensor-dependent noise model, an offset of noise generated by the first sensor element, a variance of noise generated by the first sensor element, and/or a gain of the first sensor element, and determining, as one or more parameter values of the Gaussian probability distribution function of the second sensor-dependent noise model, an offset of noise generated by the second sensor element, a variance of noise generated by the second sensor element, and/or a gain of the second sensor element.

According to an aspect of the present disclosure, an imaging device is provided, comprising one or more processing circuits and at least one computer-readable storage medium storing processor-executable instructions which, when executed by the one or more processing circuits, cause the imaging device to perform a method. The method comprises obtaining imaging data corresponding to an imaged region and acquired by at least first and second sensor elements, and fitting a parameterized model to the imaging data. The parameterized model includes a first sensor-dependent model of noise generated by the first sensor element in a first portion of the imaging data acquired by the first sensor element, and a second sensor-dependent model of noise generated by a second sensor element in a second portion of the imaging data acquired by the second sensor element. The first sensor-dependent noise model differs, at least in part, from the second sensor-dependent noise model.

In some embodiments, fitting the parameterized model to the imaging data comprises using statistical estimation to fit the parameterized model to the imaging data.

In some embodiments, the method further comprises determining one or more values of one or more respective parameters of each of the first and second sensor-dependent noise models, and using at least one parameter value of each of the first and second sensor-dependent noise models to identify at least one subset of the imaging data for further processing, wherein using statistical estimation to fit the parameterized model to the imaging data comprises estimating one or more values of one or more respective parameters of the parameterized model, and characterizing a quality of a fit between the at least one subset of the imaging data and the parameterized model having the one or more parameters with the one or more respective estimated values.

In some embodiments, the method further comprises determining one or more values of one or more respective parameters of each of the first and second sensor-dependent noise models, and the one or more parameter values of the first sensor-dependent noise model differ, at least in part, from the one or more parameter values of the second sensor-dependent noise model.

In some embodiments, each of the first and second sensor-dependent noise models comprises a Gaussian probability distribution function, and determining the one or more parameter values of each of the first and second sensor-dependent noise models comprises determining, as one or more parameter values of the Gaussian probability distribution function of the first sensor-dependent noise model, an offset of noise generated by the first sensor element, a variance of noise generated by the first sensor element, and/or a gain of the first sensor element, and determining, as one or more parameter values of the Gaussian probability distribution function of the second sensor-dependent noise model, an offset of noise generated by the second sensor element, a variance of noise generated by the second sensor element, and/or a gain of the second sensor element.

In some embodiments, the method further comprises: using one or more parameter values of the first sensor-dependent noise model to filter noise in the first portion of the imaging data acquired by the first sensor, and using one or more parameter values of the second sensor-dependent noise model to filter noise in the second portion of the imaging data acquired by the second sensor.

In some embodiments, using statistical estimation to fit the parameterized model to the imaging data comprises combining the first sensor-dependent noise model with a parameter-dependent photon shot noise model to obtain an estimate of sensor-dependent noise and photon shot noise in a first portion of the imaging data corresponding to the first sensor; and combining the second sensor-dependent noise model with a parameter-dependent photon shot noise model to obtain an estimate of sensor-dependent noise and photon shot noise in a second portion of the imaging data corresponding to the second sensor, wherein the parameter-dependent photon shot noise model depends, at least in part, on the estimated parameter values of the parameterized model.

In some embodiments, the imaging device further comprises at least the first and second sensor elements, wherein the first and second sensor elements comprise pixels, and wherein each of the first and second pixels includes a photosensitive region of a semiconductor and a portion of the semiconductor configured to read out data from the pixel.

In some embodiments, the imaging device is integrated with, included in, and/or disposed on a mobile electronic device.

According to an aspect of the present disclosure, there is provided a computer-readable storage medium storing processor-executable instructions which, when executed by one or more processing circuits, cause the processing circuits to perform a method. The method comprises obtaining imaging data corresponding to an imaged region and acquired by at least first and second sensor elements, and fitting a parameterized model to the imaging data. The parameterized model includes a first sensor-dependent model of noise generated by the first sensor element in a first portion of the imaging data acquired by the first sensor element, and a second sensor-dependent model of noise generated by a second sensor element in a second portion of the imaging data acquired by the second sensor element. The first sensor-dependent noise model differs, at least in part, from the second sensor-dependent noise model.

According to an aspect of the present disclosure, a processor-implemented imaging method is provided, comprising obtaining imaging data corresponding to an imaged region and acquired by at least one sensor element, and using a processor, fitting a parameterized model to the imaging data. Fitting the parameterized model to the imaging data comprises analytically approximating a combination of at least one sensor-dependent noise model with a parameter-dependent photon shot noise model. The at least one sensor-dependent noise model models noise generated by the at least one sensor element in the imaging data. The parameter-dependent photon shot noise model models photon shot noise based, at least in part, on at least one parameter of the parameterized model.

In some embodiments, analytically approximating the combination of the at least one sensor-dependent noise model with the parameter-dependent photon shot noise model comprises analytically approximating the convolution of the at least one sensor-dependent noise model with the parameter-dependent photon shot noise model.

In some embodiments, analytically approximating the combination of the at least one sensor-dependent noise model with the parameter-dependent photon shot noise model comprises analytically approximating a probability distribution $P_i(x)$ of a value of a pixel i using an expression including a term $e^{-\lambda}\lambda^x$.

In some embodiments the value of the pixel i comprises an ADU count of the pixel i.

In some embodiments, the probability distribution of the value of pixel i is given by $$P_i(x = [(D_i - o_i)/g_i + \text{var}_i/g_i^2] \mid u_i, \text{var}_i, g_i, o_i) = \frac{e^{-(u_i + \text{var}_i/g_i^2)}(u_i + \text{var}_i/g_i^2)^x}{\Gamma(x+1)},$$

wherein $D_i$ is an observed value of pixel i, $u_i$ is a number of expected photoelectrons of pixel i, $g_i$ is an amplification gain of pixel i, $o_i$ is an offset of readout noise of pixel i, $\text{var}_i$ is a variance of the readout noise of pixel i, and $\Gamma(x) = \int_0^\infty e^{-t} t^{x-1} dt$.

In some embodiments, fitting the parameterized model to the imaging data comprises using statistical estimation to fit the parameterized model to the imaging data.

In some embodiments, using statistical estimation to fit the parameterized model to the imaging data comprises estimating one or more values of one or more respective parameters of the parameterized model, and characterizing a quality of a fit between the at least one subset of the imaging data and the parameterized model having the one or more parameters with the one or more respective estimated values.

In some embodiments, estimating the one or more values of the one or more respective parameters of the parameterized model comprises analytically approximating the combination of the at least one sensor-dependent noise model with the parameter-dependent photon shot noise model.

In some embodiments, using statistical estimation to fit the parameterized model to the imaging data comprises using maximum likelihood estimation (MLE) to fit the parameterized model to the imaging data, using MLE to fit the parameterized model to the imaging data comprises analytically approximating the combination of the at least one sensor-dependent noise model with the parameter-dependent photon shot noise model, and characterizing a quality of a fit between the at least one subset of the imaging data and the parameterized model comprises using the first and second noise models to determine a log-likelihood ratio and/or to determine a Cramer-Rao lower bound (CRLB).

In some embodiments, using MLE to fit the parameterized model to the imaging data comprises estimating one or more values of one or more respective parameters $\theta$ according to the expression $$\hat{\theta} = \operatorname*{argmin}_{\theta}\left\{-\ln\left[\prod_{i=1}^{M} P(x = [(D_i - o_i)/g_i + \operatorname{var}_i/g_i^2] \mid u_i(\theta), bg, \operatorname{var}_i, g_i, o_i)\right]\right\},$$

wherein $D_i$ is an observed ADU count of pixel i, $u_i$ is a number of expected photoelectrons of pixel i, $g_i$ is an amplification gain of pixel i, $o_i$ is an offset of readout noise of pixel i, $\operatorname{var}_i$ is a variance of the readout noise of pixel i, bg is the expected background ADU count of pixel i, and analytically approximating the combination of the at least one sensor-dependent noise model with the parameter-dependent photon shot noise model comprises analytically approximating a probability distribution P(x) of a value of a pixel i using an expression including a term $e^{-\lambda}\lambda^x$.

In some embodiments the probability distribution P(x) of the value of pixel i is given by $$P(x = [(D_i - o_i)/g_i + \operatorname{var}_i/g_i^2] \mid u_i, \operatorname{var}_i, g_i, o_i) = \frac{e^{-(\mu_i + \operatorname{var}_i/g_i^2)}(\mu_i + \operatorname{var}_i/g_i^2)^x}{\Gamma(x+1)}.$$

In some embodiments, estimating one or more values of one or more respective parameters of the parameterized model comprises estimating one or more locations of one or more respective molecules and/or particles.

In some embodiments, the imaging method further comprises using the imaging data and the one or more estimated values of the one or more respective parameters to perform molecular localization, particle tracking, and/or super-resolution microscopy.

In some embodiments, the imaging method further comprises using the at least one sensor element to acquire the imaging data, wherein using the at least one sensor element to acquire the imaging data comprises using at least one pixel to acquire the imaging data, and wherein each of the at least one pixel includes a photosensitive region of a semiconductor and a portion of the semiconductor configured to read out data from the at least one pixel.

In some embodiments, using the at least one pixel to acquire the imaging data comprises using at least one CMOS pixel to acquire the imaging data.

In some embodiments, using the at least one pixel to acquire the imaging data comprises using at least one sCMOS pixel to acquire the imaging data.

In some embodiments, fitting the parameterized model to the imaging data yields an estimate of sensor-dependent noise and photon shot noise in the imaging data and/or an estimate of the imaging data with sensor-dependent noise and photon shot noise removed from the imaging data.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same reference number in all the figures in which they appear. For purposes of clarity, not every component may be labeled in every drawing. In the drawings.

DETAILED DESCRIPTION

Introduction

Some CMOS cameras perform poorly under low-light conditions, in part because pixel-dependent readout noise introduces artifacts and interferes with quantitative imaging analysis. Thus, some CMOS cameras may perform poorly when used for applications in which low-light imaging is important, such as single-molecule localization. However, CMOS cameras offer many advantages over other types of cameras (e.g., electron-multiplying charge-coupled devices (EMCCDs)) typically used for imaging under low-light conditions. For example, CMOS cameras (e.g., newly developed scientific CMOS (sCMOS) cameras) may be less expensive to manufacture, may exhibit higher effective quantum efficiency, may have a larger field of view, and/or may support much higher readout speeds than conventional low-light cameras. Thus, data processing techniques which improve the accuracy of CMOS cameras under low-light conditions would be beneficial in any context where low-light imaging may be performed, including quantitative image analysis, single-molecule localization, localization-based nanoscopy, single-particle tracking, machine vision, medical imaging, image reconstruction, and consumer electronics (e.g., digital still cameras and digital video cameras, smartphone cameras, etc.).

The inventors have appreciated that the performance of CMOS cameras under low-light conditions may improve significantly when appropriate data processing techniques are used to correct for the pixel-dependent readout noise introduced into the imaging data by the camera's pixels. As just one example, the data processing techniques disclosed herein may enhance the quality of images acquired under low-light conditions using CMOS cameras. As another example, when single-molecule localization techniques are applied to imaging data acquired using CMOS cameras, the data processing techniques described herein may significantly enhance the accuracy and/or precision of the molecule positions estimated from such imaging data. The inventors have also recognized and appreciated that the performance of other sensor-based techniques may improve significantly when appropriate data processing techniques are used to correct for sensor-dependent noise introduced into the sensed data by the sensors. For example, the data processing techniques described herein may improve the performance of non-optical imaging techniques such as X-ray imaging, magnetic resonance imaging (MRI), nuclear magnetic resonance (NMR), positron emission tomography (PET), and computed tomography (CT).

Disclosed herein are data processing techniques which may enhance the reliability, accuracy, and/or precision of information derived from data acquired using sensor elements that introduce sensor-dependent noise into the acquired data. In some embodiments, the imaging techniques described herein may include a calibration technique suitable for determining parameter values for sensor-dependent noise models of noise generated by sensor elements during acquisition of imaging data. In some embodiments, the imaging techniques described herein may include a filtering technique suitable for filtering at least some sensor-dependent noise from acquired imaging data. In some embodiments, the imaging techniques described herein may include a model-fitting technique suitable for fitting a parameterized model to the acquired imaging data.

In some embodiments, reliable position estimates for single-molecule localization applications may be obtained from noisy imaging data by applying suitable data processing techniques to correct for pixel-dependent readout noise in the imaging data. Single-molecule localization techniques typically involve fitting a parameterized model to imaging data to determine the parameter values (e.g., molecule positions) that are likely to correspond to the acquired imaging data. The fitting of the parameterized model to the imaging data is typically performed using a statistical estimation technique (e.g., maximum likelihood estimation (MLE), Bayesian estimation, method of moments, least-squares estimation, etc.), whereby one or more parameter values which yield a suitable fit between the actual imaging data and the results predicted by the parameterized model are estimated.

Noise in imaging data tends to interfere with the accuracy of statistical estimation based on that imaging data. In conventional single-molecule localization techniques, Poisson-distributed shot noise has been the primary expected source of noise. Readout noise has been ignored because single-molecule localization typically has been performed using EMCCD cameras, for which the error introduced by readout noise is typically within the tolerances of the localization precision. However, the inventors have recognized and appreciated that when CMOS cameras (e.g., sCMOS cameras) are used, failure to correct for pixel readout noise may significantly degrade the accuracy and precision of single-molecule localization techniques.

The various aspects described above, as well as further aspects, will now be described in detail below. It should be appreciated that these aspects may be used alone, all together, or in any combination of two or more, to the extent that they are not mutually exclusive.

As used herein, "imaging" may refer to the acquisition, processing, and/or presentation of information relating to one or more attributes of a region. Attributes of a region may include, but are not limited to, physical attributes (e.g., position, shape, contour, color, orientation, etc.), chemical attributes (e.g., density, chemical composition, etc.), anatomical attributes, biological attributes, functional attributes, and/or any other suitable attributes of objects, materials, cells, and/or particles in the region. The acquisition of imaging information may be performed using any suitable technique, including, but not limited to, optical techniques (e.g., photodetection), acoustical techniques (e.g., ultrasound), and/or electromagnetic techniques (e.g., X-ray, magnetic resonance, positron emission tomography (PET), computed tomography (CT)). In some embodiments, the processing and presentation of imaging information may include formation and display of an image representing one or more attributes of the region.

Modeling Sensor-Dependent Noise

When multiple sensor elements are used to acquire data for a data set, and two or more of the sensor elements introduce noise having different characteristics into the acquired data, the data set is said to include or be contaminated by sensor-dependent noise. In some embodiments, modeling the sensor-dependent noise introduced into a data set by the sensors used to acquire the data may facilitate data processing techniques whereby the sensor-dependent noise is identified, distinguished from the underlying data, removed from the data set, and/or subjected to processing which improves the reliability, precision, and/or accuracy of information derived from the data set. This section describes a technique for modeling sensor-dependent noise generated by the pixels of a CMOS camera (e.g., pixel-dependent readout noise).

In some embodiments, the readout noise distribution for a pixel may be modeled as a Gaussian probability distribution. This distribution may describe the temporal analog-to-digital unit (ADU) count fluctuation of the pixel under dark conditions (e.g., with zero expected incident photons). In some embodiments, a pixel's readout noise distribution may be characterized by the distribution's mean ("offset"), the distribution's variance, and/or the pixel's gain ("amplification gain"), each of which may vary from pixel to pixel.

In some embodiments, the ADU count output of a pixel follows a probability distribution which may be described as a combination (e.g., convolution) of the signal-dependent, Poission-distributed shot noise corresponding to the photon detection process and the pixel-dependent, Gaussian-distributed readout noise corresponding to the pixel's readout circuitry. The probability distribution function (PDF) for an individual pixel i may, in some embodiments, be described by $$P_i(D) = A \sum_{q=0}^{\infty} \frac{1}{q!} e^{-u_i} u_i^q \frac{1}{\sqrt{2\pi \text{var}_i}} e^{-\frac{(D-q \cdot g_i - o_i)^2}{2 \text{var}_i}}. \tag{1}$$

Here, $P_i(\ )$ represents the pixel's PDF, D represents the pixel's ADU count, A is a normalization constant, $u_i$ is the number of expected photoelectrons ($e^-$) of pixel i, $g_i$ is the amplification gain (ADUs/$e^-$) for pixel i, $o_i$ is the mean (offset) of the readout noise of pixel i, and $\text{var}_i$ is the variance of the readout noise of pixel i.

Data-Processing Techniques

Figure 1:
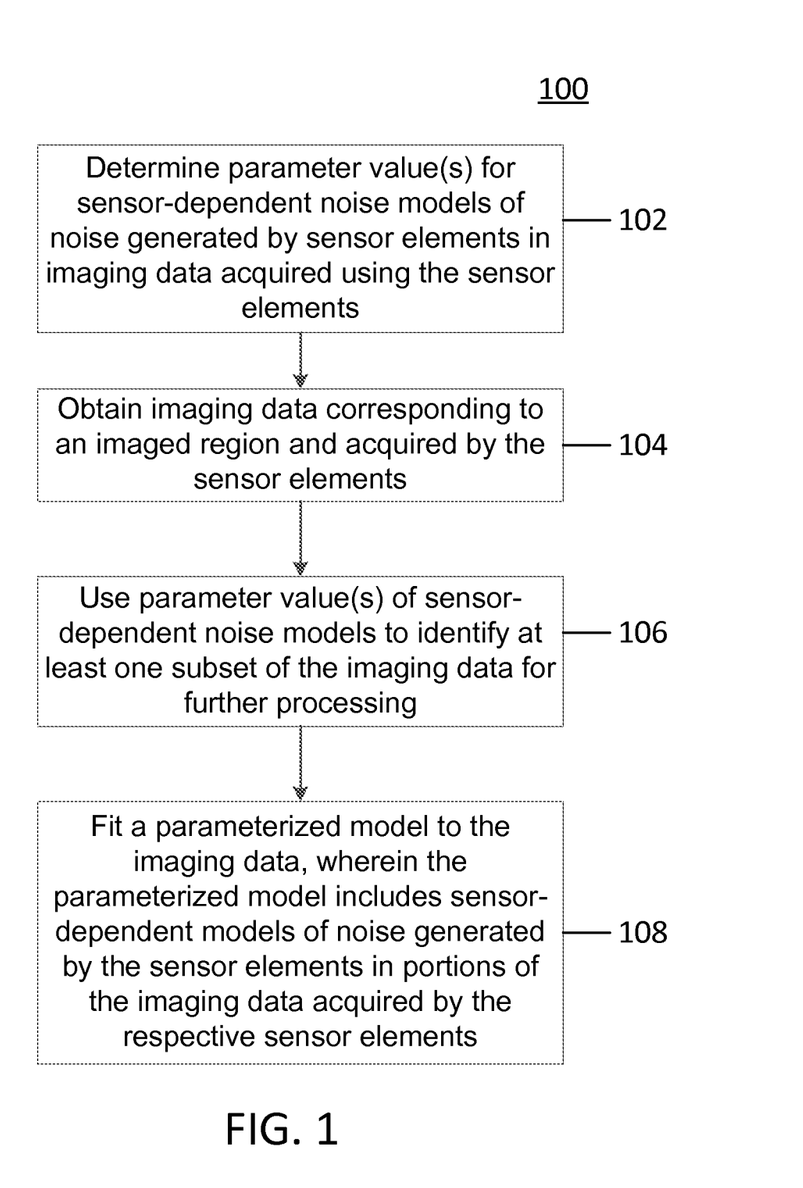
FIG. 1 is a flowchart of an imaging method, in accordance with some embodiments.

FIG. 1 illustrates an imaging method 100, in accordance with some embodiments. In some embodiments, applying imaging method 100 to noisy imaging data may yield reliable position estimates for single-molecule localization applications.

At step 102 of imaging method 100, parameter values are determined for sensor-dependent noise models of sensor-dependent noise generated by sensor elements in imaging data acquired using the sensor elements. The processing performed in step 102 may be referred to herein as "calibration" processing. In some embodiments, the sensor elements may be pixels (e.g., CMOS pixels). In some embodiments, the sensor-dependent noise models may include Gaussian distributions representing the sensor-dependent noise characteristics of the respective sensor elements (e.g., pixel-dependent readout noise). In some embodiments, the parameters of a noise model may include the sensor-dependent mean (offset) of the Gaussian distribution of the sensor element's noise, the sensor-dependent variance of the Gaussian distribution of the sensor element's noise, and/or the sensor element's gain.

In some embodiments, the offset of the Gaussian distribution of a pixel's readout noise may be determined using imaging data acquired while the pixel is dark. For example, a pixel's readout noise offset may be calculated as the average ADU count of the pixel over a set of frames acquired while the pixel is dark. A pixel may be dark when the number of incident photons on the pixel is expected to be zero or negligible. In some embodiments, a dark environment may be established by placing a camera in a dark room or by covering the camera's lens with a lens cap.

The offset values of a camera's pixels may be determined using any suitable technique, including, but not limited to, the following process. In one step of the process, the camera's pixels may be exposed to a dark environment. In another step of the process, a set of M image frames may be acquired while the pixels are exposed to the dark environment. In another step of the process, the offset $o_i$ for any pixel i may be calculated as $$o_i = \frac{1}{M} \sum_{m=1}^{M} S_i^m. \quad (2)$$

Here, $S_i^m$ is the ADU count at frame m for pixel i, and M is the total number of dark frames acquired.

In some embodiments, the variance of the Gaussian distribution of a pixel's readout noise may be determined using imaging data acquired while the pixel is in a dark environment. For example, a pixel's readout noise variance may be calculated as the variance of the pixel's ADU count over a set of frames acquired while the pixel is dark. The variance values of a camera's pixels may be determined using any suitable technique, including, but not limited to, the following process. In one step of the process, the camera's pixels may be exposed to a dark environment. In another step of the process, a set of M image frames may be acquired while the pixels are exposed to the dark environment. In another step of the process, the variance $var_i$ for any pixel i may be calculated as $$var_i = \frac{1}{M} \sum_{m=1}^{M} (S_i^m)^2 - o_i^2. \quad (3)$$

In some embodiments, the same set of M image frames may be used to determine the offset and variance values of the readout noise distributions of a camera's pixels. In some embodiments, a large number M of image frames (e.g., thousands, tens of thousands, approximately 60,000, or hundreds of thousands) may be obtained to estimate the variance and offset values with suitable precision.

In some embodiments, a pixel's gain may be determined using imaging data acquired while the pixel is exposed to a specified number of photons. The gain values of a camera's pixels may be determined using any suitable technique, including, but not limited to, the following process. In one step of the process, a series of image sequences may be acquired. During each image sequence, the pixels of interest may be illuminated at a specified intensity level (e.g., at an average intensity level ranging from approximately 20 photons per pixel to approximately 200 photons per pixel). For example, the pixels of interest may be illuminated with quasi-uniform stationary intensity patterns. The intensity levels may vary among the different image sequences. In some embodiments, the number of images acquired during each image sequence may be large (e.g., hundreds of images, thousands of images, tens of thousands of images, approximately 20,000 images, or hundreds of thousands of images).

In another step of the process, the series of image sequences may be used to calculate the gains of one or more pixels of interest. For the intensity levels described above, the total variance of the camera output in pixel i at a specified illumination intensity may be approximated as the sum of the photon shot noise-induced variance and the Gaussian variance of the pixel, $var_i$. Thus, the gain of pixel i may be estimated using $$\hat{g}_i = \operatorname{argmin} \sum_{k=1}^{K} \left( (v_i^k - var_i) - g_i(\overline{D_i^k} - o_i) \right)^2, \quad (4)$$

where K is the total number of illumination levels acquired for the gain calibration process, k is the $k^{th}$ illumination sequence, $\overline{D_i^k}$ stands for the mean ADU count obtained from temporal averaging of all frames acquired during illumination sequence k in pixel i, $o_i$ and $var_i$ are the mean and variance values for pixel i, and $v_i^k$ stands for the temporal variance of the ADU counts for illumination sequence k in pixel i. The units of gain $g_i$ may be ADU/e⁻.

The linear least square minimization problem represented by Eq. (4) may be simplified into the form $$\hat{g}_i = (B_i B_i^T)^{-1} B_i A_i^T \quad (5),$$

where $$A_i = \{(v_i^1 - var_i), \ldots, (v_i^k - var_i), \ldots, (v_i^K - var_i)\},$$

$$B_i = \{(\overline{D_i^1} - o_i), \ldots, (\overline{D_i^k} - o_i), \ldots, (\overline{D_i^K} - o_i)\}.$$

At step 104 of imaging method 100, imaging data corresponding to an imaged region and acquired by the sensor elements is obtained. In some embodiments, obtaining the imaging data may comprise producing the imaging data (e.g., using the sensor elements to sense signals associated with the imaged region), loading the imaging data (e.g., from a computer-readable storage medium), and/or receiving the imaging data (e.g., via a network). The imaging data may relate to one or more attributes of the imaged region.

In steps 106-108 of imaging method 100, sensor-dependent noise models may be used to enhance the quality of image processing performed on the imaging data. In some embodiments, the sensor-dependent noise model of Eq. (1) may be used to enhance the accuracy and/or precision of a single-molecule localization process.

At step 106 of imaging method 100, the parameter values of the sensor-dependent noise models (e.g., the means of the sensor elements' Gaussian-distributed readout noise, the variances of the sensor elements' Gaussian-distributed readout noise, and/or the gains of the sensor elements) may be used to identify at least one subset of the imaging data obtained in step 104 for further processing. In some embodiments, the identified subset(s) may comprise portions of the imaging data satisfying one or more criteria, wherein satisfying the one or more criteria indicates that the subset of imaging data may contain information of interest. The processing performed in step 106 may be referred to herein as "image segmentation" or "segmentation" processing.

Identification of subset(s) of the imaging data for further processing may be performed using any suitable segmentation technique, including, but not limited to, the following process. At one step of the process, portions of the imaging data may be statistically weighted according to the sensor-dependent gain, variance, and/or offset values associated with the sensor element that acquired the respective portion of imaging data. This smoothing technique may reduce noise which might otherwise be interpreted as meaningful data. For example, in the context of single-molecule localization, this smoothing technique may reduce noise which might otherwise be interpreted as single molecules.

In some embodiments, one or more smoothing filters may be applied to the imaging data to reduce or eliminate noise. The filtered noise may include, for example, Poisson-distributed shot noise, noise arising from heterogeneous background fluorescence, noise arising from non-uniform gains of sensor elements, and/or readout noise introduced by the sensor elements. In some embodiments, the one or more smoothing filters may comprise one or more uniform filters and/or Gaussian filters. In some embodiments, the one or more smoothing filters may use one or more parameters of the sensor-dependent noise models to filter sensor-dependent noise, such as readout noise. In some embodiments, the filter kernel may be defined as $$unif(D_i, n) = \frac{\sum_{i \in C_{n \times n}} \left[\frac{(D_i - o_i)}{g_i var_i}\right]}{\sum_{i \in C_{n \times n}} var_i^{-1}}, \quad (6)$$

where $D_i$ is the ADU count for pixel i, $g_i$ is the gain for pixel i, $var_i$ is the variance for pixel i, and $C_{n \times n}$ represents the kernel region. In some embodiments, the kernel region may comprise an n×n square region centered around pixel i. In some embodiments, smoothed imaging data may be obtained by performing a pixel-wise subtraction between two sets of imaging data resulting from two filter applications with different kernel sizes n:

$$S_1 = unif(D, \lfloor 2\sigma_{PSF} + 1 \rfloor) - unif(D, \lfloor 4\sigma_{PSF} + 1 \rfloor) \quad (7),$$

where $\lfloor x \rfloor$ describes the largest integer less than or equal to x, and D represents the entire set of acquired imaging data.

At another step of the process, the smoothed imaging data may be processed to identify one or more subsets of imaging data for further processing. In some embodiments, subsets of the smoothed imaging data containing local maxima may be suitable for further processing. For example, in single-molecule localization applications, the subsets of imaging data containing local maxima may be the subsets of imaging data likely to contain information relating to single molecules. In some embodiments, local maxima may be identified using a maximum filter and a binary operation.

At step 108 of imaging method 100, a parameterized model may be fitted to the imaging data (or to one or more subsets of the imaging data). In some embodiments, the parameterized model may be a model of the imaged region, a model of one or more attributes of the imaged region, and/or a model of one or more conditions relating to the imaged region. The parameterized model may include at least one parameter. In the context of single-molecule localization, the parameters of the parameterized model may include, for example, the positions of one or more molecules in the imaged region. The parameterized model may include sensor-dependent noise models. Fitting the parameterized model to the imaging data may comprise determining value(s) of the parameter(s) for which the parameterized model sufficiently fits the imaging data.

In some embodiments, one or more statistical estimation techniques may be used to fit the parameterized model to the imaging data. Any suitable statistical estimation technique may be used to fit the parameterized model to the imaging data, including, but not limited to, maximum likelihood estimation (MLE), Bayesian estimation, method of moments, and/or least-squares estimation. In some embodiments, using statistical estimation to fit a parameterized model to imaging data may comprise performing an iterative fitting process as illustrated in FIG. 2.

Figure 2:
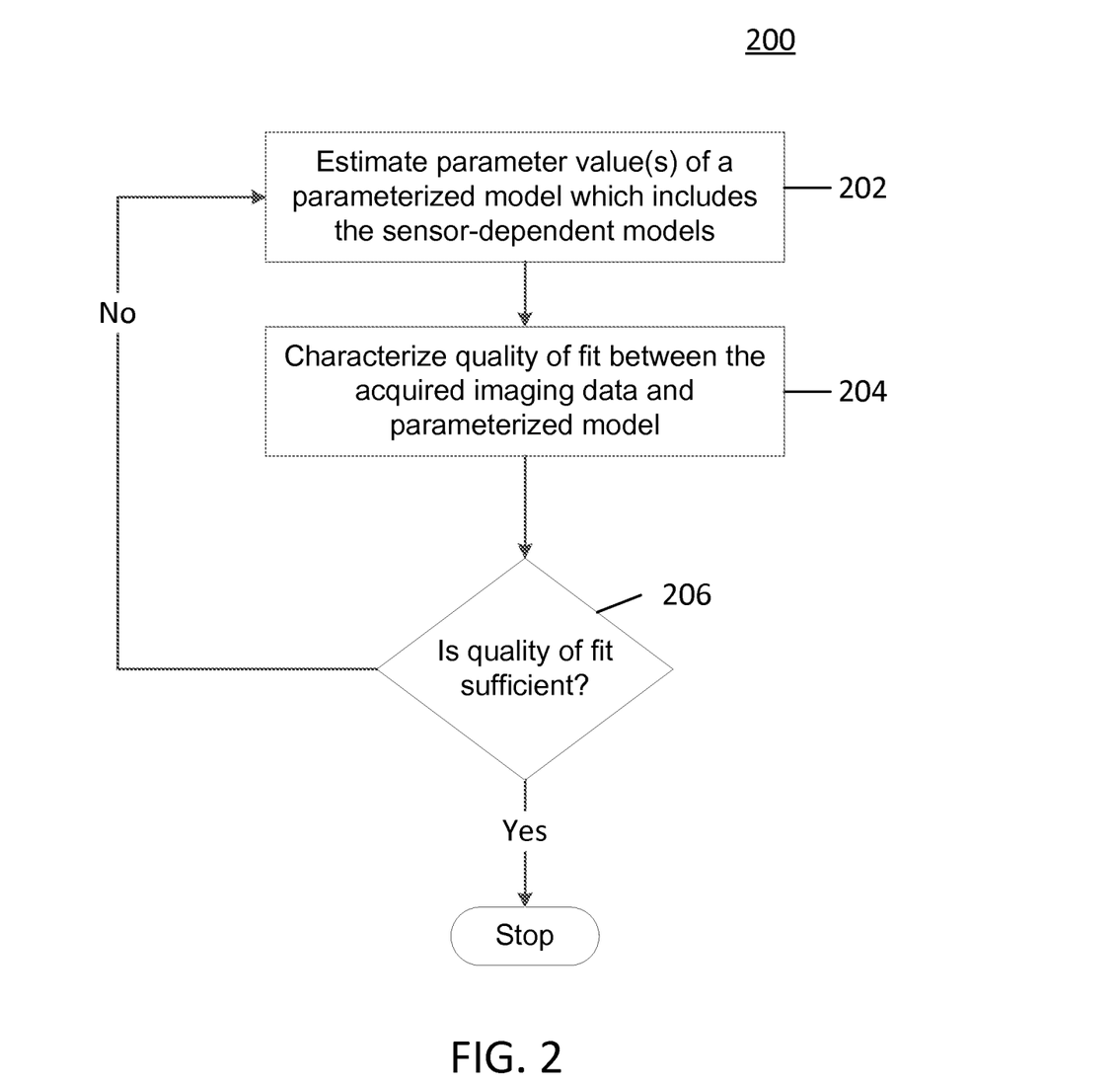
FIG. 2 is a flowchart of a method of fitting a parameterized model to imaging data, according to some embodiments.

At step 202 of the fitting process illustrated in FIG. 2, one or more parameter values of the parameterized model are estimated. In some embodiments, estimating one or more parameter values of the parameterized model may comprise evaluating the probability distribution of noise in the imaging data to which the parameterized model is being fitted. In some embodiments, the noise in the imaging data may include signal-dependent, Poisson-distributed photon shot noise and pixel-dependent, Gaussian-distributed readout noise. Thus, in some embodiments, evaluating the probability distribution of noise in the imaging data to which the parameterized model is being fitted may comprise evaluating a probability distribution that is a combination (e.g., convolution) of the shot noise Poisson distribution and the readout noise Gaussian distribution. In some embodiments, such a combined probability distribution may be evaluated for one or more pixels (e.g., all pixels) of the imaging data (or subset of imaging data) to which the parameterized model is being fitted during each fitting iteration of the statistical estimation process.

In some embodiments, the combined probability distribution of the ADU count of a pixel may be evaluated by evaluating Eq. (1). In some embodiments, the combined probability distribution of the ADU count of a pixel may be evaluated using an analytical approximation of Eq. (1). For example, the probability distribution of Eq. (1) may be analytically approximated as $$P_i(x = [(D_i - o_i)/g_i + var_i/g_i^2] \mid u_i, var_i, g_i, o_i) = \quad (8)$$

$$\frac{e^{-(\mu_i + var_i/g_i^2)}(\mu_i + var_i/g_i^2)^x}{\Gamma(x+1)},$$

where $u_i$ stands for the number of expected photons from the fitting model at pixel i, and where the complete Gamma function $\Gamma(x)$ is defined as $\Gamma(x) = \int_0^\infty e^{-t} t^{x-1} dt$. The fitting model may, in some embodiments, be a single 2D Gaussian model (e.g., for single emitter fitting) or a multiple Gaussian model (e.g., for multi-emitter fitting). In some embodiments, statistical estimation based on the analytical approximation of the probability distribution may provide optimal accuracy and precision at the theoretical limit. Since the analytical approximation of the likelihood function of Eq. (8) resembles a Poisson distribution (e.g., the likelihood function of Eq. (8) includes a term of the form $e^{-\lambda}\lambda^x$, where $\lambda=\mu_i+\text{var}_i/g_i^2$), conventional statistical estimation techniques for single-molecule localization and/or multi-emitter fitting may be adapted to incorporate sensor-dependent noise models by substituting the probability distribution of Eq. (8) for the conventional Poisson-distributed noise models.

In some embodiments, maximum likelihood estimation (MLE) may be used to estimate the one or more parameter values of the parameterized model. The MLE for the parameterized model of Eq. (8) may be expressed as $$\hat{\theta} = \underset{\theta}{\operatorname{argmin}} \left\{ -\ln\left[\prod_{i=1}^{M} P(x = [(D_i - o_i)/g_i + \text{var}_i/g_i^2] \mid u_i(\theta), bg, \text{var}_i, g_i, o_i)\right]\right\}, \quad (10)$$

where $\hat{\theta}$ is the maximum likelihood estimate for the one or more parameter values $\theta$, where M is the total number of pixels in the fitting sub-region, and where bg represents the expected background ADU count of pixel i.

At steps 204 and 206 of fitting process 200, the quality of the fit between the acquired imaging data (or subset of acquired imaging data) and the parameterized model is characterized. If the quality of fit is sufficient, fitting process 200 ends. If the quality of fit is not sufficient, another iteration of fitting process 200 may be performed.

Conceptually, characterizing the quality of fit between the acquired imaging data and the parameterized model may be regarded as a process of (1) using the parameterized model to generate an estimate of the imaging data that the sensor elements would have acquired if the estimated parameter values accurately described the conditions relevant to the imaging region at the time the actual imaging data was acquired, and (2) determining how closely the estimated imaging data matches the actual imaging data. Any suitable technique may be used to characterize the quality of fit between the parameterized model and the imaging data, including, but not limited to, goodness-of-fit filtering ("rejection") and/or uncertainty estimation.

In some embodiments, goodness-of-fit filtering may be used to identify non-converging fits and/or unacceptable fit errors (e.g., fit errors that exceed an error threshold). In some embodiments, performing goodness-of-fit filtering may comprise determining the value of a Log-likelihood ratio (LLR) metric. In some embodiments, the LLR metric may be expressed as $$LLR = -2\ln\prod_{i=1}^{M}\left(\frac{P(x = [(D_i - o_i)/g_i + \text{var}_i/g_i^2] \mid u_i(\theta), bg, \text{var}_i, g_i, o_i)}{P\left(x = \left[(D_i - o_i)/g_i + \text{var}_i/g_i^2\right] \mid \frac{(D_i - o_i)}{g_i}, bg, \text{var}_i, g_i, o_i\right)}\right), \quad (11)$$

where θ represents the estimated parameter values. The LLR metric may approximately follow a chi-squared distribution with M-K degrees of freedom where M is the number of pixels in the fitting sub-region and K is the total number of parameters estimated in the fitting process.

In some embodiments, performing goodness-of-fit filtering may further comprise using the LLR metric to calculate a p-value for the fit. In some embodiments, the p-value for a fit may be compared to a threshold, and fits with p-values below the threshold may be rejected.

In some embodiments, uncertainty estimation may be performed. The uncertainty (or precision) of the estimated values of the parameters of the fitted parameterized model may be estimated using any suitable technique. In some embodiments, the uncertainty may be estimated using the Cramer-Rao lower bound (CRLB) with the likelihood function of Eq. (8).

Additional Embodiments

It should be appreciated that, in some embodiments, an imaging method may comprise fewer than all the steps illustrated in FIG. 1. In some embodiments, an imaging method may include a step 104 of obtaining imaging data corresponding to an imaged region and acquired by sensor elements, and a step 108 of fitting a parameterized model to the imaging data, wherein the parameterized model includes sensor-dependent models of noise generated by the sensor elements in portions of the imaging data acquired by the respective sensor elements.

Such an imaging method may be suitable for identifying sensor-dependent noise in a data set (e.g., pixel-dependent readout noise in imaging data acquired by CMOS pixels, sensor-dependent noise in X-ray data, MRI data, NMR data, PET data, CT data, etc.), distinguishing sensor-dependent noise from the underlying data, removing (e.g., filtering) the sensor-dependent noise from the data set, and/or subjecting the data set to any suitable processing which improves the reliability, precision, and/or accuracy of information derived from the data set. Such an imaging method may be suitable for removing artifacts from images acquired by CMOS pixels under low-light conditions, and/or for improving the resolution of images acquired by CMOS pixels under low-light conditions.

Although embodiments and examples relating to single-molecule localization have been described, some embodiments are not limited to single-molecule localization. Embodiments of the data processing techniques described herein may be applied to any suitable application, including, but not limited to quantitative imaging applications, qualitative imaging applications, single-particle tracking (e.g., at temporal resolutions up to approximately 20 kHz), multi-emitter fitting, screening of cells by super-resolution imaging, medical imaging, X-ray imaging, magnetic resonance imaging (MRI), nuclear magnetic resonance (NMR), positron emission tomography (PET), computed tomography (CT), machine vision, image reconstruction, low-light imaging, and/or consumer electronics.

In some embodiments, the data processing techniques described herein may be performed "online" or "in real-time." For example, the data processing techniques described herein may performed on low-light images acquired by CMOS cameras in real-time, such that the processed image may be viewed at substantially the same time the imaging data is acquired. As another example, the data processing techniques described herein may be used to perform online molecular localization. As another example, the data processing techniques described herein may be used to perform screening of fixed or living cells with a frame rate of up to approximately 32 reconstructed images per second.

The benefits of the data processing techniques described herein may be realized in any context where (1) noise characteristics of different sensor elements are different, and (2) sensor-dependent noise is not dominated by other forms of noise.

In some embodiments, an analytical approximation of the probability distribution of Eq. (1) (including, but not limited to, the analytical approximation given in Eq. (8)) may be used to model a combination of sensor-dependent noise and signal-dependent photon shot noise, even when the same sensor-dependent noise model is used for different sensor elements. A common model for noise generated by multiple sensors may be obtained using any suitable technique. As just one example, values of parameters of a common noise model may be estimated for a set of two or more sensor elements (e.g., based on data acquired by the set of sensor elements or by some subset of the sensor elements), and these same parameter values may be used to model the noise contributed by each of the sensor elements in the set. In this way, the computational benefits of the analytical approximation of the combination of the sensor-dependent noise model and the signal-dependent photon shot noise model may be obtained even in circumstances where distinct noise models are not used to model the noise generated by distinct sensor elements.

Figure 3:
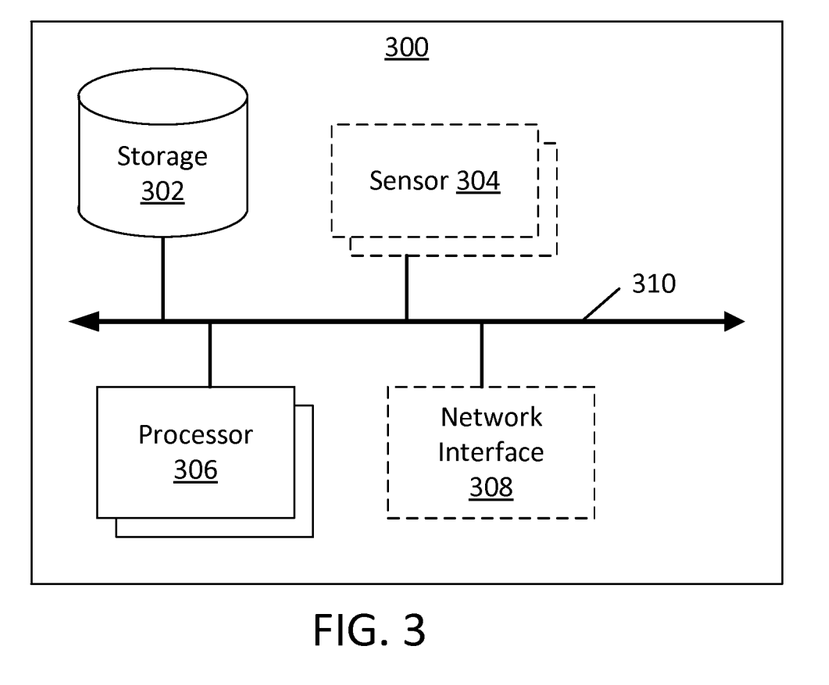
FIG. 3 is a block diagram illustrating a computer system which may be configured to perform one or more aspects of an imaging method, in accordance with some embodiments.

An imaging system or apparatus in accordance with the techniques described herein may take any suitable form, as embodiments are not limited in this respect. FIG. 3 illustrates a computer system which may be configured to perform one or more aspects of an imaging method, in accordance with some embodiments. One or more computer systems such as computer system 300 may be used to implement any of the functionality described above. The computer system 300 may include one or more processors 306 and one or more computer-readable storage media 302 (i.e., tangible, non-transitory, computer-readable media), e.g., one or more volatile storage media and/or one or more non-volatile storage media. The one or more processors 306 may control writing of data to and reading of data from the storage 302 in any suitable manner. The one or more processors 306 may control movement of data on interconnection network 310 in any suitable manner.

To perform any of the functionality described herein, the one or more processors 306 may execute one or more instructions stored in one or more computer-readable storage media (e.g., storage 302), which may serve as tangible, non-transitory, computer-readable media storing instructions for execution by one or more processors 306. In some embodiments, one or more processors 306 may include one or more processing circuits, including, but not limited to, a central processing unit (CPU), a graphics processing unit (GPU), a field-programmable gate array (FPGA), an accelerator, and/or any other suitable device (e.g., circuit) configured to process data.

In some embodiments, computer system 300 may include sensors 304. In some embodiments, the sensors 304 may introduce sensor-dependent noise into sensor data acquired using the sensors, at least under some sensing conditions. In some embodiments, the sensors 304 may include sensors of any suitable type(s), including, but not limited to, acoustical sensors, optical sensors, and/or electromagnetic sensors. In some embodiments, the sensors 304 may include pixels (e.g., CMOS pixels, such as sCMOS pixels). In some embodiments, the sensors may be sensors integrated with, included in, and/or disposed on an electronic device, including, but not limited to, a mobile electronic device, a mobile phone, a smartphone, a laptop computer, a camera (e.g., a still camera, web camera, video camera, etc.), and/or any other suitable electronic device.

In some embodiments, computer system 300 may include a network interface 308 suitable for processing communication between computer system 300 and a network (e.g., a computer network). In some embodiments, computer system 300 may be configured to use network interface 308 to obtain imaging data. Such imaging data may, for example, have been acquired using sensors that are external to computer system 300 or not controlled by computer system 300.

It should be appreciated from the foregoing that some embodiments are directed to imaging methods, as illustrated in FIG. 1. Such methods may be performed, for example, by one or more components of a computer system 300, although other implementations are possible, as the methods are not limited in this respect.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The above-described embodiments can be implemented in any of numerous ways. For example, the embodiments may be implemented using hardware, software or a combination thereof. When implemented in software, the software code can be executed on any suitable processor (e.g., processing circuit) or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, various aspects may be embodied and/or implemented at least in part as at least one computer-readable storage medium (i.e., at least one tangible, non-transitory computer-readable medium) encoded with a computer program (a plurality of instructions), which, when executed on one or more processors, cause the above-discussed steps or acts to be performed. Examples of a computer-readable storage medium may include, but are not limited to, a computer memory, a floppy disk, a compact disc, an optical disc, a magnetic tape, a flash memory, a circuit configuration in a Field Programmable Gate Array (FPGA) or other semiconductor device, or other tangible, non-transitory computer-readable medium. As is apparent from the foregoing examples, a computer readable storage medium may retain information for a sufficient time to provide computer-executable instructions in a non-transitory form. The computer-readable storage medium may be transportable, such that the program or programs stored thereon can be loaded onto one or more different computers or other processors to implement various aspects of the present technology as discussed above. In some embodiments, processing of data and aspects of system operation may be implemented entirely, or at least in part, in FPGAs as hard-wired computer-executable instructions.

Computer-executable instructions may be in any one or combination of several forms, such as program modules, executed by one or more computers or other devices. Generally, program modules may include routines, programs, objects, components, data structures, etc. that perform particular tasks or implement particular abstract data types. Typically the functionality of the program modules may be combined or distributed as desired in various embodiments.

Computer-executable instructions may be executable on one or more processors that employ any one of a variety of operating systems or platforms. Additionally, such instructions may be written using any of a number of suitable programming languages and/or programming or scripting tools, and also may be compiled as executable machine language code or intermediate code that is executed on a framework or virtual machine.

Processors may be implemented as circuits (e.g., integrated circuits), including commercially-available circuits known in the art by names such as CPU chips, GPU chips, microprocessors, microcontrollers, or co-processors. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially-available, semi-custom, or custom-built. As a specific example, some commercially-available microprocessors have multiple cores such that one or a subset of those cores may constitute a processor suitable for implementing functionality described above. Though, a processor may be implemented using logic circuitry in any suitable format.

A data-processing device may be embodied in any of a number of forms, such as a rack-mounted computer, a desktop computer, a laptop computer, or a tablet computer. Additionally, a data-processing device may comprise embedded data-processing circuitry in a device not generally regarded as a computer but with suitable processing capabilities, including a Personal Digital Assistant (PDA), a smart phone, or any other suitable portable or fixed electronic device.

The terms "program" or "software" are used in a generic sense to refer to computer code or set of computer-executable instructions that can be employed to program a computer or other processor to implement various aspects of the present technology as discussed above. Additionally, in some embodiments, one or more computer programs that when executed perform methods of the present technology need not reside on a single computer or processor, but may be distributed in a modular fashion amongst a number of different computers or processors to implement various aspects of the present technology.

The phraseology and terminology used herein is for the purpose of description and should not be regarded as limiting.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A processor-implemented imaging method, comprising:
obtaining imaging data corresponding to an imaged region and acquired by at least first and second sensor elements; and
using a processor, fitting a parameterized model to the imaging data, wherein the parameterized model includes a first sensor-dependent noise model generated by the first sensor element in a first portion of the imaging data acquired by the first sensor element, and a second sensor-dependent noise model generated by the second sensor element in a second portion of the imaging data acquired by the second sensor element, wherein:
the first sensor-dependent noise model differs, at least in part, from the second sensor-dependent noise model; and
fitting the parameterized model to the imaging data comprises:
combining the first sensor-dependent noise model with a parameter-dependent photon shot noise model to obtain an estimate of sensor-dependent noise and photon shot noise in the first portion of the imaging data; and
combining the second sensor-dependent noise model with the parameter-dependent photon shot noise model to obtain an estimate of sensor-dependent noise and photon shot noise in the second portion of the imaging data.

2. The imaging method of claim 1, wherein fitting the parameterized model to the imaging data further comprises using statistical estimation to fit the parameterized model to the imaging data.

3. The imaging method of claim 2, further comprising:
determining one or more values of one or more respective parameters of each of the first and second sensor-dependent noise models; and
using at least one parameter value of each of the first and second sensor-dependent noise models to identify at least one subset of the imaging data for further processing,
wherein using statistical estimation to fit the parameterized model to the imaging data comprises:
estimating one or more values of one or more respective parameters of the parameterized model, and
characterizing a quality of a fit between the at least one subset of the imaging data and the parameterized model having the one or more parameters with the one or more respective estimated values.

4. The imaging method of claim 3, wherein using statistical estimation to fit the parameterized model to the imaging data comprises using maximum likelihood estimation (MLE) to fit the parameterized model to the imaging data, and wherein characterizing a quality of a fit between the at least one subset of the imaging data and the parameterized model comprises using the first and second noise models to determine a log-likelihood ratio and/or to determine a Cramer-Rao lower bound (CRLB).

5. The imaging method of claim 4, wherein using MLE to fit the parameterized model to the imaging data comprises estimating one or more values of one or more respective parameters θ according to the expression $$\hat{\theta} = \underset{\theta}{\operatorname{argmin}} \left\{ -\ln \left[ \prod_{i=1}^{M} P(x = [(D_i - o_i)/g_i + \operatorname{var}_i/g_i^2] \mid u_i(\theta), bg, \operatorname{var}_i, g_i, o_i) \right] \right\},$$

$D_i$ is an observed ADU count of pixel i,
$u_i$ is a number of expected photoelectrons of pixel i,
$g_i$ is an amplification gain of pixel i,
$o_i$ is an offset of readout noise of pixel i,
$\operatorname{var}_i$ is a variance of the readout noise of pixel i, and
$b_g$ is the expected background ADU count of pixel i.

6. The imaging method of claim 3,
wherein the parameter-dependent photon shot noise model depends, at least in part, on the one or more estimated parameter values of the parameterized model.

7. The imaging method of claim 6, wherein combining the first sensor-dependent noise model with the parameter-dependent photon shot noise model comprises determining a convolution of the first sensor-dependent noise model with the parameter-dependent photon shot noise model.

8. The imaging method of claim 6, wherein combining the first sensor-dependent noise model with the parameter-dependent photon shot noise model comprises analytically approximating a convolution of the first sensor-dependent noise model with the parameter-dependent photon shot noise model.

9. The imaging method of claim 8, wherein analytically approximating the convolution of the first sensor-dependent noise model with the parameter-dependent photon shot noise model comprises analytically approximating a probability distribution $P_i(x)$ of an ADU count of a pixel i using an expression including a term $e^{-\lambda}\lambda^x$.

10. The imaging method of claim 9, wherein the probability distribution of the ADU count of pixel i is given by $$P_i(x = [(D_i - o_i)/g_i + \operatorname{var}_i/g_i^2] \mid u_i, \operatorname{var}_i, g_i, o_i) = \frac{e^{-(\mu_i + \operatorname{var}_i/g_i^2)}(\mu_i + \operatorname{var}_i/g_i^2)^x}{\Gamma(x+1)},$$

$D_i$ is an observed ADU count of pixel i,
$u_i$ is a number of expected photoelectrons of pixel i,
$g_i$ is an amplification gain of pixel i,
$o_i$ is an offset of readout noise of pixel i,
$\operatorname{var}_i$ is a variance of the readout noise of pixel i, and $\Gamma(x) = \int_0^\infty e^{-t} t^{x-1} dt.$ 11. The imaging method of claim 3, wherein using at least one parameter value of the first and second sensor-dependent noise models to identify at least one subset of the imaging data for further processing comprises using one or more parameter values of the first sensor-dependent noise model to filter noise in the first portion of the imaging data acquired by the first sensor, and using one or more parameter values of the second sensor-dependent noise model to filter noise in the second portion of the imaging data acquired by the second sensor.

12. The imaging method of claim 11, wherein using one or more parameter values of the first sensor-dependent noise model to filter noise in the first portion of the imaging data comprises filtering the first portion of the imaging data using a filter kernel defined by $$unif(D_i, n) = \frac{\sum_{i \in C_{n \times n}} \left[\frac{(D_i - o_i)}{g_i \text{var}_i}\right]}{\sum_{i \in C_{n \times n}} \text{var}_i^{-1}},$$

$D_i$ is an observed ADU count of pixel i, $g_i$ is an amplification gain of pixel i, $o_i$ is an offset of readout noise of pixel i, $\text{var}_i$ is a variance of the readout noise of pixel i, n is a kernel size, and $C_{n \times n}$ is a kernel region including pixel i.

13. The imaging method of claim 3, wherein estimating one or more values of one or more respective parameters of the parameterized model comprises estimating one or more locations of one or more respective molecules and/or particles.

14. The imaging method of claim 13, further comprising using the imaging data and the one or more estimated values of the one or more respective parameters to perform molecular localization, particle tracking, and/or super-resolution microscopy.

15. The imaging method of claim 2, further comprising using at least the first and second sensor elements to acquire the imaging data, wherein using at least the first and second sensor elements to acquire the imaging data comprises using at least first and second pixels to acquire the imaging data, and wherein each of the first and second pixels includes a photosensitive region of a semiconductor and a portion of the semiconductor configured to read out data from the pixel.

16. The imaging method of claim 15, wherein using at least first and second pixels to acquire the imaging data comprises using at least first and second CMOS pixels to acquire the imaging data.

17. The imaging method of claim 15, wherein using at least first and second pixels to acquire the imaging data comprises using at least first and second sCMOS pixels to acquire the imaging data.

18. The imaging method of claim 1, further comprising determining one or more values of one or more respective parameters of each of the first and second sensor-dependent noise models, wherein the one or more parameter values of the first sensor-dependent noise model differ, at least in part, from the one or more parameter values of the second sensor-dependent noise model.

19. The imaging method of claim 18, wherein each of the first and second sensor-dependent noise models comprises a Gaussian probability distribution function, and wherein determining the one or more parameter values of each of the first and second sensor-dependent noise models comprises:

determining, as one or more parameter values of the Gaussian probability distribution function of the first sensor-dependent noise model, an offset of noise generated by the first sensor element, a variance of noise generated by the first sensor element, and/or a gain of the first sensor element; and determining, as one or more parameter values of the Gaussian probability distribution function of the second sensor-dependent noise model, an offset of noise generated by the second sensor element, a variance of noise generated by the second sensor element, and/or a gain of the second sensor element.

20. An imaging device, comprising:

one or more processing circuits; and at least one computer-readable storage medium storing processor-executable instructions which, when executed by the one or more processing circuits, cause the imaging device to perform a method comprising:

obtaining imaging data corresponding to an imaged region and acquired by at least first and second sensor elements; and fitting a parameterized model to the imaging data, wherein the parameterized model includes a first sensor-dependent noise model generated by the first sensor element in a first portion of the imaging data acquired by the first sensor element, and a second sensor-dependent noise model generated the second sensor element in a second portion of the imaging data acquired by the second sensor element, wherein:

the first sensor-dependent noise model differs, at least in part, from the second sensor-dependent noise model; and fitting the parameterized model to the imaging data comprises:

combining the first sensor-dependent noise model with a parameter dependent photon shot noise model to obtain an estimate of sensor-dependent noise and photon shot noise in the first portion of the imaging data; and combining the second sensor-dependent noise model with the parameter-dependent photon shot noise model to obtain an estimate of sensor-dependent noise and photon shot noise in the second portion of the imaging data.

21. The imaging device of claim 20, wherein fitting the parameterized model to the imaging data further comprises using statistical estimation to fit the parameterized model to the imaging data.

22. The imaging device of claim 21, wherein the method further comprises:

determining one or more values of one or more respective parameters of each of the first and second sensor-dependent noise models; and using at least one parameter value of each of the first and second sensor-dependent noise models to identify at least one subset of the imaging data for further processing, wherein using statistical estimation to fit the parameterized model to the imaging data comprises:

estimating one or more values of one or more respective parameters of the parameterized model, and characterizing a quality of a fit between the at least one subset of the imaging data and the parameterized model having the one or more parameters with the one or more respective estimated values.

23. The imaging device of claim 21, wherein:

the method further comprises determining one or more values of one or more respective parameters of each of the first and second sensor-dependent noise models, and the one or more parameter values of the first sensor-dependent noise model differ, at least in part, from the one or more parameter values of the second sensor-dependent noise model.

24. The imaging device of claim 23, wherein each of the first and second sensor-dependent noise models comprises a Gaussian probability distribution function, and wherein determining the one or more parameter values of each of the first and second sensor-dependent noise models comprises:

determining, as one or more parameter values of the Gaussian probability distribution function of the first sensor-dependent noise model, an offset of noise generated by the first sensor element, a variance of noise generated by the first sensor element, and/or a gain of the first sensor element; and determining, as one or more parameter values of the Gaussian probability distribution function of the second sensor-dependent noise model, an offset of noise generated by the second sensor element, a variance of noise generated by the second sensor element, and/or a gain of the second sensor element.

25. The imaging device of claim 23, wherein the method further comprises:

using one or more parameter values of the first sensor-dependent noise model to filter noise in the first portion of the imaging data acquired by the first sensor, and using one or more parameter values of the second sensor-dependent noise model to filter noise in the second portion of the imaging data acquired by the second sensor.

26. The imaging device of claim 21, wherein the parameter-dependent photon shot noise model depends, at least in part, on the estimated parameter values of the parameterized model.

27. The imaging device of claim 20, further comprising at least the first and second sensor elements, wherein the first and second sensor elements comprise pixels, and wherein each of the first and second pixels includes a photosensitive region of a semiconductor and a portion of the semiconductor configured to read out data from the pixel.

28. The imaging device of claim 20, wherein the imaging device is integrated with, included in, and/or disposed on a mobile electronic device.

29. A computer-readable storage medium storing processor-executable instructions which, when executed by one or more processing circuits, cause the processing circuits to perform a method comprising:

obtaining imaging data corresponding to an imaged region and acquired by at least first and second sensor elements; and fitting a parameterized model to the imaging data, wherein the parameterized model includes a first sensor-dependent noise model generated by the first sensor element in a first portion of the imaging data acquired by the first sensor element, and a second sensor-dependent noise model generated by the second sensor element in a second portion of the imaging data acquired by the second sensor element, wherein:

the first sensor-dependent noise model differs, at least in part, from the second sensor-dependent noise model; and fitting the parameterized model to the imaging data comprises:

combining the first sensor-dependent noise model with a parameter-dependent photon shot noise model to obtain an estimate of sensor-dependent noise and photon shot noise in the first portion of the imaging data; and combining the second sensor-dependent noise model with the parameter-dependent photon shot noise model to obtain an estimate of sensor-dependent noise and photon shot noise in the second portion of the imaging data.

30. A processor-implemented imaging method, comprising:

obtaining imaging data corresponding to an imaged region and acquired by at least one sensor element; and using a processor, fitting a parameterized model to the imaging data, wherein fitting the parameterized model to the imaging data comprises analytically approximating a combination of at least one sensor-dependent noise model with a parameter-dependent photon shot noise model, wherein the at least one sensor-dependent noise model models noise generated by the at least one sensor element in the imaging data, and wherein the parameter-dependent photon shot noise model models photon shot noise based, at least in part, on at least one parameter of the parameterized model.

31. The imaging method of claim 30, wherein analytically approximating the combination of the at least one sensor-dependent noise model with the parameter-dependent photon shot noise model comprises analytically approximating the convolution of the at least one sensor-dependent noise model with the parameter-dependent photon shot noise model.

32. The imaging method of claim 30, wherein analytically approximating the combination of the at least one sensor-dependent noise model with the parameter-dependent photon shot noise model comprises analytically approximating a probability distribution $P_i(x)$ of an ADU count of a pixel i using an expression including a term $e^{-\lambda}\lambda^x$.

33. The imaging method of claim 32, wherein the value of the pixel i comprises an ADU count of the pixel i.

34. The imaging method of claim 32, wherein the probability distribution of the value of pixel i is given by $$P_i(x = [(D_i - o_i)/g_i + \text{var}_i/g_i^2] \mid u_i, \text{var}_i, g_i, o_i) = \frac{e^{-(\mu_i + \text{var}_i/g_i^2)}(\mu_i + \text{var}_i/g_i^2)^x}{\Gamma(x+1)},$$

$D_i$ is an observed ADU count of pixel i,
$u_i$ is a number of expected photoelectrons of pixel i,
$g_i$ is an amplification gain of pixel i,
$o_i$ is an offset of readout noise of pixel i,
$\text{var}_i$ is a variance of the readout noise of pixel i, and $\Gamma(x) = \int_0^\infty e^{-t} t^{x-1} dt$.

35. The method of claim 30, wherein fitting the parameterized model to the imaging data comprises using statistical estimation to fit the parameterized model to the imaging data.

36. The method of claim 35, wherein using statistical estimation to fit the parameterized model to the imaging data comprises:

estimating one or more values of one or more respective parameters of the parameterized model, and characterizing a quality of a fit between the at least one subset of the imaging data and the parameterized model having the one or more parameters with the one or more respective estimated values.

37. The method of claim 36, estimating the one or more values of the one or more respective parameters of the parameterized model comprises analytically approximating the combination of the at least one sensor-dependent noise model with the parameter-dependent photon shot noise model.

38. The imaging method of claim 35, wherein using statistical estimation to fit the parameterized model to the imaging data comprises using maximum likelihood estimation (MLE) to fit the parameterized model to the imaging data, wherein using MLE to fit the parameterized model to the imaging data comprises analytically approximating the combination of the at least one sensor-dependent noise model with the parameter-dependent photon shot noise model, and wherein characterizing a quality of a fit between the at least one subset of the imaging data and the parameterized model comprises using the first and second noise models to determine a log-likelihood ratio and/or to determine a Cramer-Rao lower bound (CRLB).

39. The imaging method of claim 38, wherein using MLE to fit the parameterized model to the imaging data comprises estimating one or more values of one or more respective parameters θ according to the expression $$\hat{\theta} = \underset{\theta}{\mathrm{argmin}} \left\{ -\ln\left[ \prod_{i=1}^{M} P(x = [(D_i - o_i)/g_i + \mathrm{var}_i/g_i^2] \mid u_i(\theta), bg, \mathrm{var}_i, g_i, o_i) \right] \right\},$$

$D_i$ is an observed ADU count of pixel i, $u_i$ is a number of expected photoelectrons of pixel i, $g_i$ is an amplification gain of pixel i, $o_i$ is an offset of readout noise of pixel i, $\mathrm{var}_i$ is a variance of the readout noise of pixel i, and $b_g$ is the expected background ADU count of pixel i, and analytically approximating the combination of the at least one sensor-dependent noise model with the parameter-dependent photon shot noise model comprises analytically approximating a probability distribution $P_i(x)$ of an ADU count of a pixel i using an expression including a term $e^{-\lambda}\lambda^x$.

40. The imaging method of claim 39, wherein the probability distribution P(x) of the value of pixel i is given by $$P(x = [(D_i - o_i)/g_i + \mathrm{var}_i/g_i^2] \mid u_i, \mathrm{var}_i, g_i, o_i) = \frac{e^{-(\mu_i + \mathrm{var}_i/g_i^2)}(\mu_i + \mathrm{var}_i/g_i^2)^x}{\Gamma(x+1)}.$$

41. The imaging method of claim 36, wherein estimating one or more values of one or more respective parameters of the parameterized model comprises estimating one or more locations of one or more respective molecules and/or particles.

42. The imaging method of claim 41, further comprising using the imaging data and the one or more estimated values of the one or more respective parameters to perform molecular localization, particle tracking, and/or super-resolution microscopy.

43. The imaging method of claim 35, further comprising using the at least one sensor element to acquire the imaging data, wherein using the at least one sensor element to acquire the imaging data comprises using at least one pixel to acquire the imaging data, and wherein each of the at least one pixel includes a photosensitive region of a semiconductor and a portion of the semiconductor configured to read out data from the at least one pixel.

44. The imaging method of claim 43, wherein using the at least one pixel to acquire the imaging data comprises using at least one CMOS pixel to acquire the imaging data.

45. The imaging method of claim 43, wherein using the at least one pixel to acquire the imaging data comprises using at least one sCMOS pixel to acquire the imaging data.

46. The imaging method of claim 30, wherein fitting the parameterized model to the imaging data yields an estimate of sensor-dependent noise and photon shot noise in the imaging data and/or an estimate of the imaging data with sensor-dependent noise and photon shot noise removed from the imaging data.

\* \* \* \* \*